June 15, 1948.    H. A. GILBERT ET AL    2,443,350
APPARATUS FOR WEIGHING AND DISCHARGING DRY MATERIALS
Filed Jan. 15, 1946    7 Sheets-Sheet 3

June 15, 1948.                H. A. GILBERT ET AL                2,443,350
                APPARATUS FOR WEIGHING AND DISCHARGING DRY MATERIALS
Filed Jan. 15, 1946                                         7 Sheets-Sheet 5

Fig. 5

Inventors
Harry Albert Gilbert
Ingvar Leonard Tolf
Josephus Jackson Thayer
By Cameron, Kerkam & Sutton
Attorneys Patented June 15, 1948

UNITED STATES PATENT OFFICE 2,443,350

APPARATUS FOR WEIGHING AND DISCHARGING DRY MATERIALS

Harry A. Gilbert and Ingvar L. Tolf, Battle Creek, Mich., and Josephus J. Thayer, Elkhart, Ind., assignors to General Foods Corporation, New York, N. Y., a corporation of Delaware Application January 15, 1946, Serial No. 641,270

22 Claims. (Cl. 249—43)

1

This invention relates to apparatus for accurately weighing and discharging predetermined quantities of free-flowing dry materials, as in packaging operations and the like. For example, it is useful in weighing ground roasted coffee and similar materials, and it has been found particularly advantageous in the weighing of materials made up of somewhat larger pieces such as chocolate chips. Many other similar uses will occur to those skilled in the art.

The invention relates to weighing machines of the type having bulk and dribble streams feeding into a common scale bucket. One of the objects of the invention is to provide separate bulk and dribble streams from a single vibrating feeder, while at the same time restricting the dribble feed to a fine stream which, in the case of fairly large pieces such as chocolate chips, will deliver the material practically piece by piece to the scale bucket.

Another object is to provide concurrent but separate bulk and dribble streams as stated above together with means for interrupting the bulk stream near the end of a cycle while continuing the dribble stream to facilitate accurate weighing.

A further object is to provide for interception and storage of the interrupted bulk feed at the end of a cycle and for its immediate delivery to the bucket at the beginning of the next cycle.

A further object is to provide novel scale-actuated electrical control means for operating the feeder and controlling the bulk and dribble streams as described above.

Other objects are to provide novel and improved operating mechanisms and safety devices for a machine having the above characteristics and in general to provide a relatively simple yet reliable, effective and accurate machine of this type.

It will be understood that apparatus embodying the invention may comprise any desired number of weighing units operating concurrently, the example described hereinafter having six such units side by side. In this example, moreover, the units are arranged to discharge their weighed contents individually into cartons which are moved automatically into filling position, but it will be understood further that the invention is not restricted to such use and that a unit or units embodying the invention may be used for any other suitable purpose where weighed quantities of materials are to be discharged consecutively.

The accompanying drawings show an embodiment of the invention of the above type, but it is to be expressly understood that said drawings are for purposes of illustration only and are not to be construed as a definition of the limits of the invention, reference being had to the appended claims for this purpose.

In the drawings,

Fig. 8 is a wiring diagram of the electrical connections.

The frame of the machine may have any suitable form and construction and as shown comprises a bed plate 1 and vertical frame members 2 at each end of the machine which are interconnected by the parts described hereinafter.

At the top of the machine are a plurality of vibrating trough-shaped feeders 3, one for each weighing unit and hence six in number as shown herein. Each feeder trough is carried by a support 4 the ends of which rest on cross bars or brackets 5 extending between the end frame members 2, the supports preferably being mounted on resilient feet 6 of rubber or the like. The troughs are suitably mounted on these supports for vibration by electromagnetic means, each trough being carried in the form shown by a plurality of inclined metal plates 7 at least one of which is vibrated by an electromagnet 8.

The feeder troughs 3, being supplied with material in any suitable manner, are vibrated electromagnetically to cause the material to feed forwardly and to discharge in a stream over the forward edges 9 of the troughs, thus providing a series of bulk feeds which are continuous as long as the feeders are in operation. At the same time a dribble feeder trough 10 is secured to each of the feeders 3 so as to vibrate therewith and in position to intercept a portion of the bulk stream discharged thereby. In the form shown, the dribble feeders 10 are more or less V-shaped in cross section and of relatively small cross sectional area, being secured as by soldering or welding to the bottoms of the troughs 3 and extending forwardly substantially in the centers of the bulk streams discharged thereby. Thus a small part of each bulk feed stream is intercepted in the dribble feeder 10 and feeds forwardly therein to discharge as a dribble stream from its forward end 11. In the case of chocolate chips, for example, the dribble feeder cross section is preferably just large enough to hold one chip, so that a single line of chips is fed forwardly in each dribble feeder and discharged one by one from its forward end 11.

Figures 6, 7:
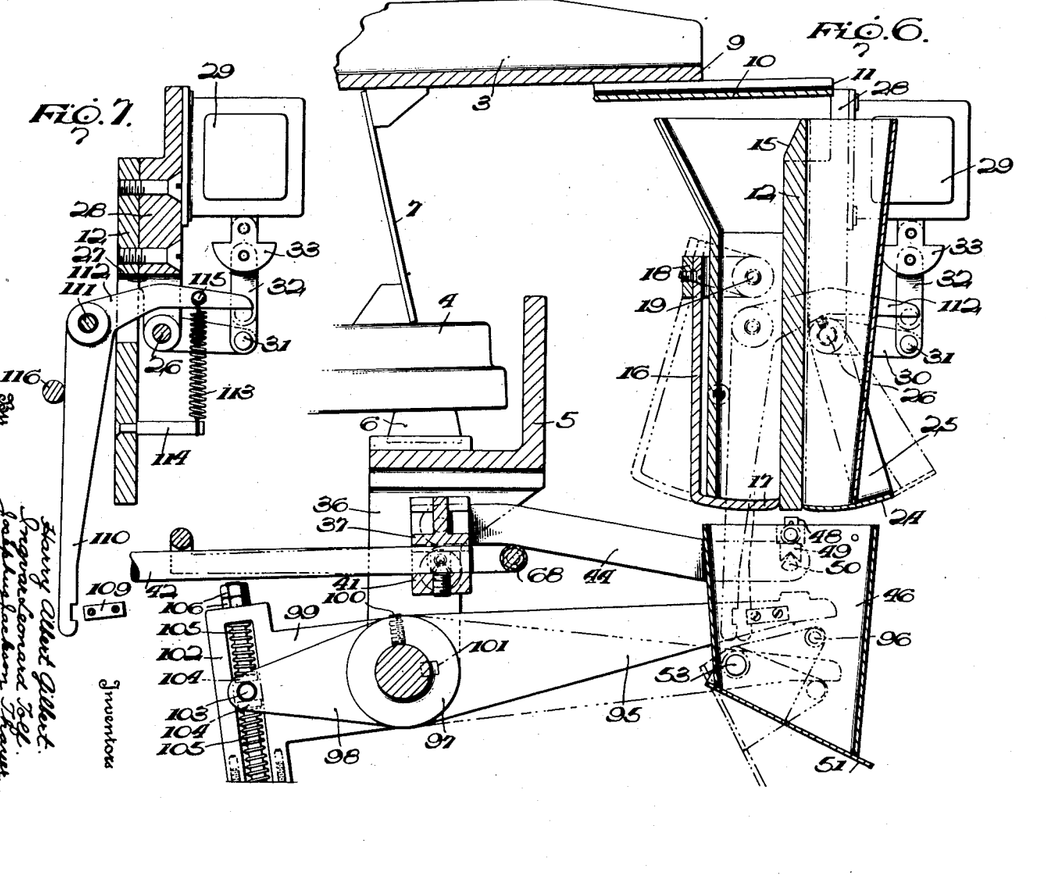
Fig. 6 is a vertical section through one of the units.
Fig. 7 shows details of the operating mechanism of one of the units.
Figure 6:
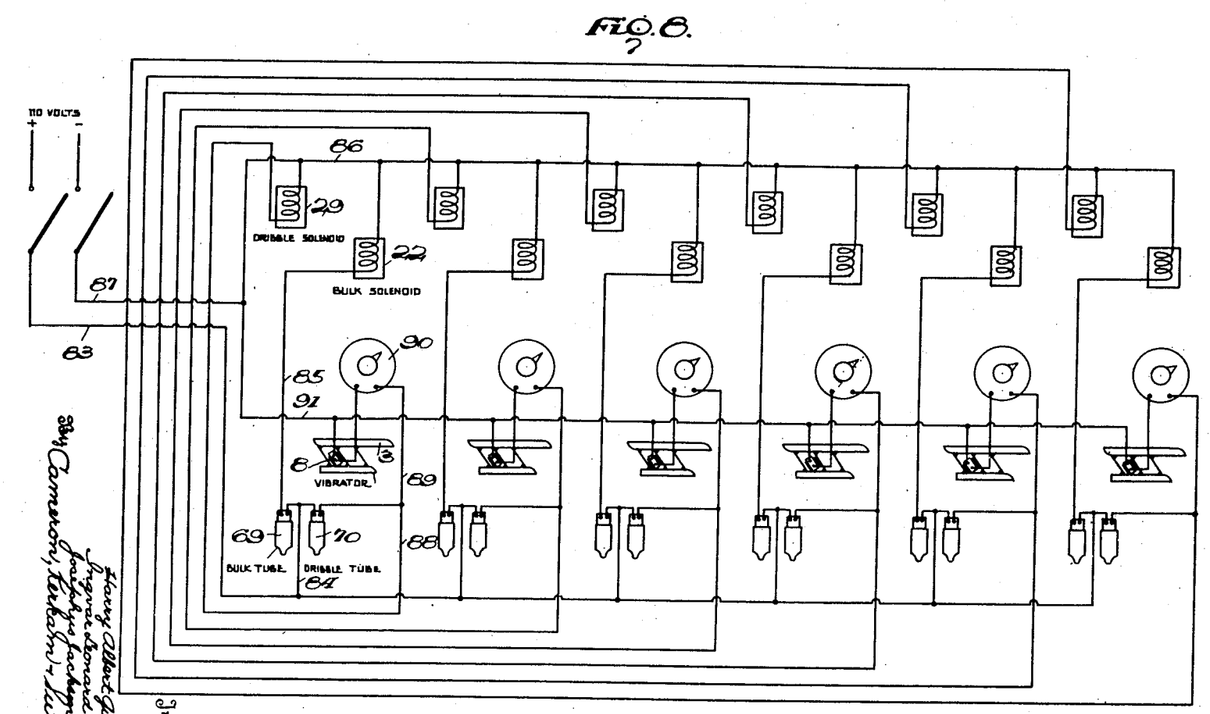

The bulk and dribble streams thus provided are discharged into separate gate-controlled bulk and dribble hoppers of any suitable type. As shown, a mounting plate 12 extends across the front of the machine between the end frames 2, the bulk streams discharging into a series of bulk hoppers 13 mounted on the inner side of the plate and the dribble streams into a series of dribble hoppers 14 mounted on the outer side of the plate. These hoppers preferably comprise V-shaped pieces of metal secured in pairs in any suitable manner to the plate 12, the hoppers 13, 14 of each pair being on opposite sides of the intervening plate 12 which thus completes and divides them. The hoppers are preferably flared at the top and the space between them due to thickness of the plate 12 is preferably filled by a tapered strip 15 conveniently secured to the bulk hopper 13 and having an inclined inner surface merging with the inner face of the plate 12 (see Fig. 6).

The bulk hopper is controlled by a gate suitably comprising a flat piece of metal 16 bent at right angles to provide a closure 17 for the bottom of the hopper. This gate is mounted to swing between open and closed positions in any suitable manner and as shown is secured to a U-shaped hinge piece 18 the legs of which straddle the sides of the hopper and are pivoted thereon at 19. One leg 20 of the hinge piece extends beyond its pivot through an opening in the plate 12 and is pivotally connected to the head 21 of the armature of a solenoid 22 mounted on the front of the plate. This solenoid when energized pulls the arm 20 downwardly and opens the bulk gate 17 against the tension of a spring 23 that extends from the arm 20 to the plate 12 and normally holds the bulk gate closed.

The dribble hopper is controlled by a gate 24 which as shown comprises the bent end of an arm 25 that is rigidly mounted on one end of a rock shaft 26, the latter being journalled in bearings at the ends of arms 27 depending from a block 28 which is secured to the plate 12 and carries a solenoid 29. Between the arms 27, a rock arm 30 is rigidly mounted on the rock shaft 26, the end of the rock arm being pinned at 31 to one end of a link 32 the other end of which is connected to the head 33 of the armature of the solenoid 29. This solenoid when energized operates the rock shaft 26 to open the dribble gate 24 against the tension of a spring 34 extending from the rock arm 30 to a pin 35 in the plate 12, this spring normally holding the gate closed.

When either the bulk gate or the dribble gate of any unit is open and the feeder is operating, material drops through either or both hoppers as the case may be into a scale bucket forming part of a weighing scale the movement of which controls the solenoids 22 and 29 and the electromagnet 8 of that unit through suitable switches. Hence it is convenient to describe next the details of one of the scale mechanisms as shown herein.

Figure 5:
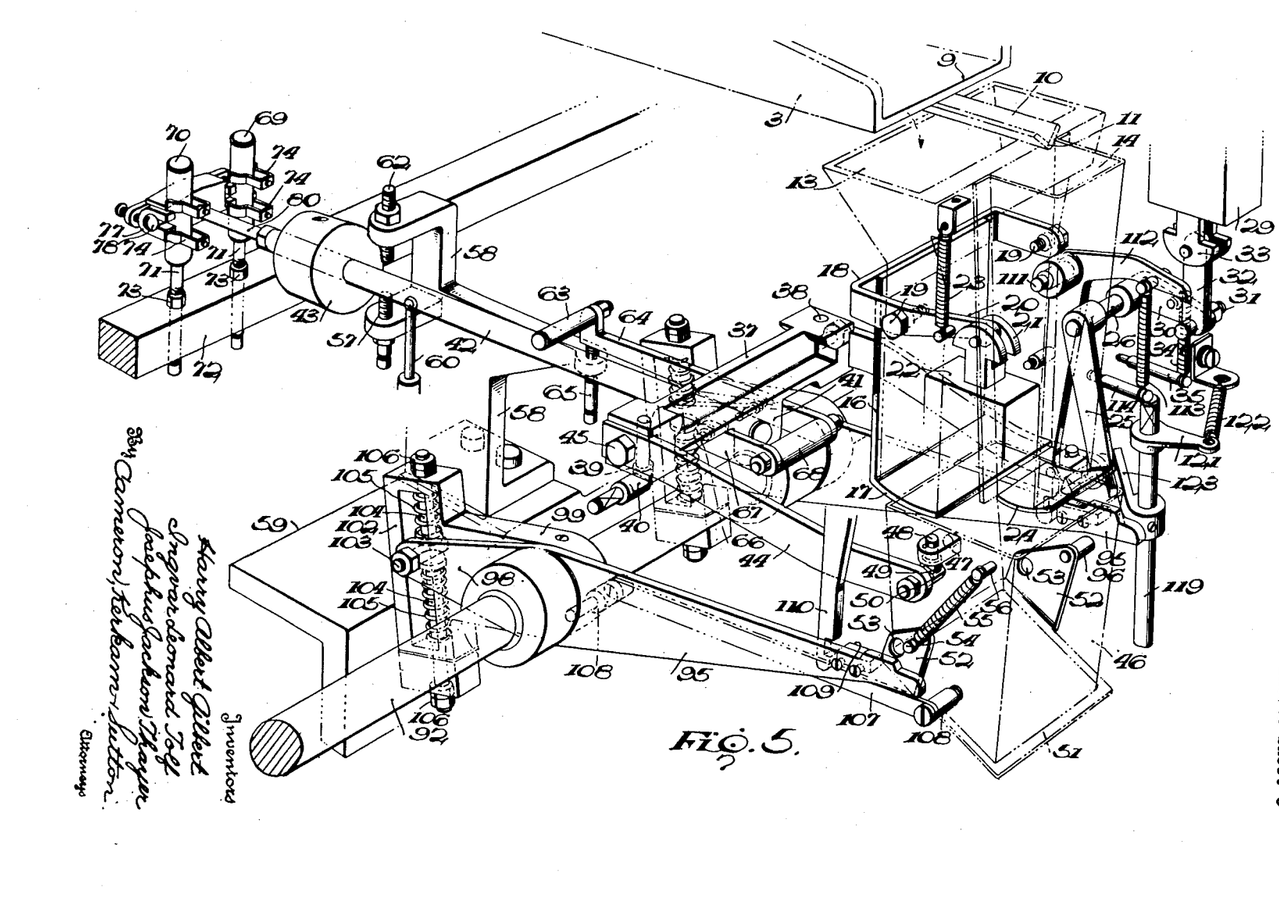
Fig. 5 is a perspective view illustrating one of the units.

Depending from the cross bar 5 mentioned above are a series of brackets 36 between which the several scale units are located. Each unit comprises a cross bar 37 extending substantially between two adjacent brackets 36, the bar 37 having vertical openings one near each end to receive pins 38. The lower ends of these pins beneath the bar 37 are provided with notched heads 39 which rest on knife edges 40 secured to the adjacent brackets 36, the cross bar thus providing a main scale pivot. Depending centrally from the cross bar is a boss 41 that is bored to receive one end of a scale beam stem 42 carrying a longitudinally adjustable weight 43. Also secured to the cross bar 37 are forwardly extending scale beam arms 44, these arms being set in recesses in the ends of the cross bar as shown in Fig. 5 and held in place by screws 45. A scale bucket 46 hangs between the forward ends of the arms 44 in position to receive material discharged from both the bulk and dribble hoppers. In the form shown, lugs 47 project from the sides of the bucket near its top, each lug having a vertical opening to receive a pin 48. The lower ends of these pins are provided with notched heads 49 which rest on knife edges 50 projecting from the adjacent arms 44.

The bottom of the bucket is closed by a gate 51 having ears 52 straddling the sides of the bucket and pivoted thereon at 53. One of the ears 52 carries a spring pin 54 from which a spring 55 extends to a pin 56 on the side of the bucket, this spring normally holding the gate 51 closed. The other ear 52 is utilized to open the bucket at intervals as hereinafter described.

When the bucket is emptied, the scale beam stem 42 descends to a lowermost position limited by an adjustable stop 57 in one arm of a bracket 58 mounted on a cross bar 59 that extends between the end frames 2. The descending movement of the scale beam stem is preferably damped as by means of a link 60 and dashpot 61, the link being pivoted to the scale beam stem 42 and the dash pot being mounted on the cross bar 59. As the bucket is filled, the scale beam stem rises, its upper position being limited by an adjustable stop 62 in another arm of the bracket 58. Moreover, as the scale beam stem reaches a predetermined point in its upward movement, it picks up an auxiliary or dribble weight 63 which projects from the end of a pivotally mounted arm 64 over the scale beam stem. The lowermost position of the dribble weight, i. e., the point at which it is picked up by the scale beam stem, is determined by an adjustable stop 65 in another arm of the bracket 58, the arm 64 normally resting on this stop.

The arm 64 is mounted to pivot on an axis intersecting the axis of the scale beam stem and coaxial with the knife edges 40 of the cross bar 37. To this end the boss 41 of the cross bar is provided with aligned openings extending to each side of the bore in which the end of the scale beam stem is inserted. Pivot pins 66 project from these openings, and the bar 64 is pivoted at one intermediate point on one of these pins, the bar extending forwardly in parallel with a link 67 mounted on the other pin and the ends of the bar and link being connected by a spacer 68.

The vertical movement of the scale beam stem is utilized to operate suitable electric switches controlling the circuits of the solenoids 22 and 29 and of the electromagnet 8. Each unit has two switches, one of which controls the bulk gate solenoid 22 and the other of which controls the dribble gate solenoid 29 and the electromagnet 8 in accordance with the cycle described below. In the form shown, mercury tube switches 69 and 70 of known type are employed for this purpose, these switches being mounted on vertically adjustable stems 71 that extend through openings in a supporting bar 72 mounted between the end frames 2, and the stems being secured in adjusted position by lock nuts 73. The tubes 69 and 70 may also be supported by clips 74 carried by a plate 75 attached to the bar 72.

The tube switches 69 and 70 are actuated in known manner by vertically movable magnets 76 and 77 respectively, these magnets being mounted by screws 78 in the recessed ends of a magnet bracket 79 which in turn is carried by a scale beam stem extension 80. A magnet adjusting plate 81 is mounted on the end of the extension 80 and carries adjusting screws 82 whereby the distance of the magnets from the tubes 69 and 70 can be adjusted.

A cycle of filling and weighing of one of the buckets 46 can now be described with reference to the wiring diagram of Fig. 8. When the bucket is emptied, the scale beam stem 42 descends and the magnets close both switches 69 and 70. Current from the supply main 83 passes through wire 84 to the switch 69 and wire 85 to the bulk gate solenoid 22, and thence by wire 86 back to the other supply main 87. Simultaneously current passes through wire 84 to the switch 70 and thence in parallel through wires 88 and 89. Wire 88 leads to the dribble gate solenoid 29, from which the current passes through wire 86 to the main 87. Wire 89 conducts current in series through a control element 90 and the electromagnet 8 and thence to a wire 91 which leads back to the main 87.

Thus both gates are opened and the feeder started simultaneously, the operation of the feeder depending on the setting of the control element 90. Bulk and dribble streams are thereby discharged simultaneously through their respective hoppers into the bucket 46. As the bucket fills, it descends and the scale beam stem 42 and weight 43 rise until the dribble weight 63 is picked up. At about this instant, magnet 76 operates switch 69 to open the circuit through the solenoid 22, whereupon the bulk gate 17 is immediately closed by its spring. However, the feeder continues to operate, the bulk stream now being intercepted in the bulk hopper but the dribble stream continuing to fill the bucket 46 until it lifts the scale beam stem with both weights 43 and 63 and brings the magnet 77 up to a position where it opens switch 70. At this instant the solenoid 29 is deenergized and the dribble gate 24 is immediately closed by its spring, shutting off all feed to the bucket. Operation of the feeder is stopped simultaneously.

The bucket 46 now contains a weighed charge of material and is ready to be dumped. The bulk hopper contains a stored partial charge, and the dribble hopper will also usually contain a small amount of intercepted material. At the beginning of the next cycle, when the bulk and dribble gates are opened as described above, the intercepted and stored material in both hoppers is immediately discharged into the bucket to fill it partially and start the weighing operation.

It will be apparent that the bucket 46 can be dumped by any suitable mechanism that is caused to operate as soon as the bucket is filled and weighed. In the present instance, however, six units are mounted side by side and it is desirable to dump all six buckets simultaneously into suitable receptacles such as cartons. Hence the dumping operation must be timed at intervals sufficient to permit the removal of six filled receptacles or cartons and their replacements by six empty receptacles or cartons in position to receive the contents of the buckets when next dumped. In this case the interval between dumping operations may be considerably longer than the time required for filling and weighing. Such an arrangement is shown herein by way of example, the empty cartons being moved into position beneath the buckets on an intermittently operating carrier and the dumping mechanism being operated in timed relation therewith.

The six buckets are dumped simultaneously by means operated from a common rock-shaft 92 mounted in bearings at the lower ends of the brackets 36, the shaft being rocked at timed intervals by any suitable means such as a rock arm 93 and connecting rod 94. Since all of the dumping mechanisms are the same, the description of one will suffice. Each bucket is dumped by a dump lever 95 extending forwardly from the rock shaft on one side of the bucket and over a pin 96 projecting from the adjacent ear 52 of the bucket gate 51, so that the lever engages the pin when the shaft 92 is rocked and opens the gate against the tension of its spring 55. As the rock shaft and dump lever return to normal position, the gate is closed again by the spring.

It is desirable to provide safety means for preventing operation of the dump lever 95 under certain conditions as hereinafter described, and for this reason the lever has a lost motion connection with the rock-shaft 92. In the form shown, the hub 97 of the dump lever is mounted loosely on the rock-shaft and the lever has an arm 98 extending rearwardly of the rock-shaft. An operating arm or lever 99 is secured to the shaft as by a set screw 100 and key 101 and terminates in a slotted head 102. The end of the arm 98 carries a pin 103 projecting into the slot in the head 102 between headed pins 104 each surrounded by a spring 105 and extending freely through the adjacent end of the head 102 in which it is secured by nuts 106. This arrangement permits oscillation of the rock-shaft without operation of the dump lever in case the latter is held against movement by one of the safety devices. It also permits a certain amount of adjustment of the normal position of the dump lever, by adjusting the effective length of the spring bolts 104.

It is desirable to steady the buckets 46 against vibration and swinging on their knife edge supports, and to this end a steady arm or link 107 extends from each bucket to the adjacent bracket 36, the ends of the steady arm preferably having open-ended slots which fit on studs 108 on the bracket and bucket.

It may happen that for some reason the filling and weighing cycle is not complete at one of the buckets by the time the rock-shaft operates. To prevent dumping a bucket under such conditions, the dump lever carries a small plate 109 projecting from one side and adapted to be engaged by a notched latch lever 110 that is pivoted at 111 on the side of the bulk hopper and has an arm 112 extending through an opening in the plate 12 and above the end of the pin 31 forming part of the dribble gate operating connections. The lever 110, 112 is normally maintained in the position shown in Fig. 7, in which the dump lever is free to operate, by means of a spring 113 extending from a pin 114 on the plate 12 to a pin 115 on the arm 112, the arm 110 being thereby held against a fixed stop 116. Whenever the dribble gate solenoid 29 is energized, however, the pin 31 is lifted and engages the arm 112, swinging the arm 110 into latching engagement with the abutment 109. Hence the bucket can not be dumped as long as the dribble gate solenoid is energized, and as explained above this solenoid is deenergized only upon opening the switch 70 by operation of the scale, which at the same time stops the feeder.

Each bucket 46 is dumped into one of a series of cartons 117 that are moved into position below the buckets by means of any suitable conveying apparatus 118. In the event that there is no carton at any one of the six positions, however, means are provided for preventing dumping of the bucket at that position. In the form shown, a vertical shaft 119 is mounted at the side of the bucket adjacent the dump lever, the lower end of the shaft having a finger 120 in position to be engaged and pushed out of the way by the carton. At the top of the shaft is an arm 121 connected by a spring 122 to the plate 12, whereby the shaft 119 is normally held in a position in which its finger 120 projects in the path of the carton. With the shaft in this position, an arm 123 near its upper end extends under the abutment plate 109 on the dump lever and thus prevents dumping of the bucket until the carton is in place and engages the finger 120 to swing the shaft 119 and remove the arm 123 from beneath the abutment plate.

Figure 1:
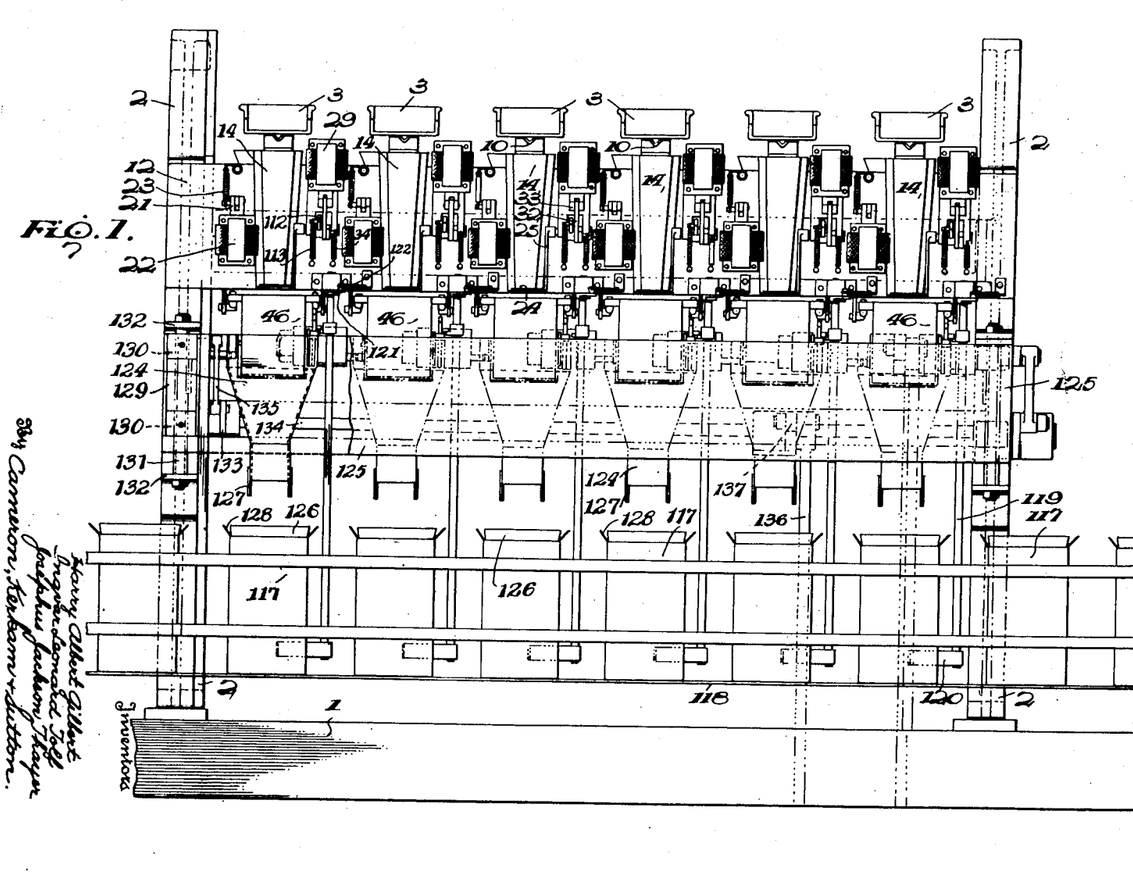
Fig. 1 is a front view of the machine.
Figure 2:
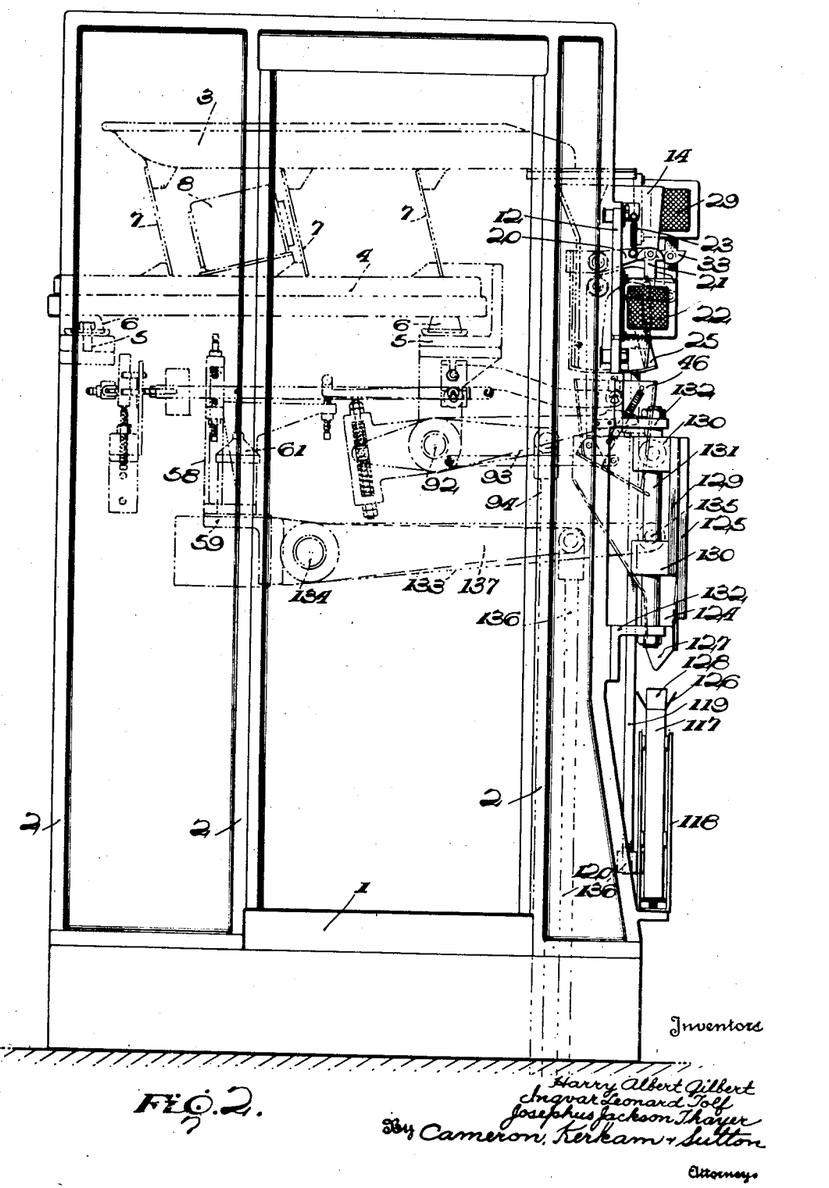
Fig. 2 is an end view of the machine.
Figure 3:
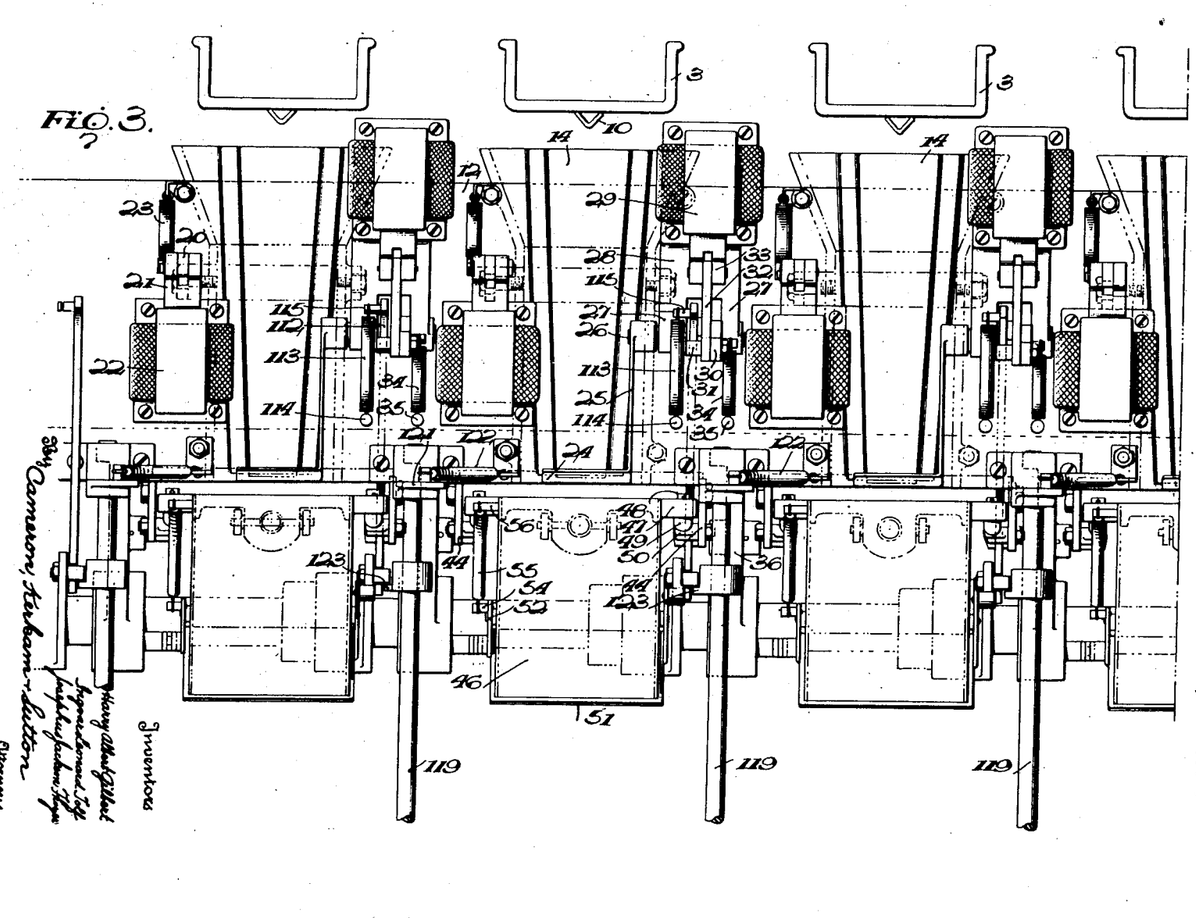
Fig. 3 is an enlarged front view showing several of the weighing units in greater detail.
Figure 4:
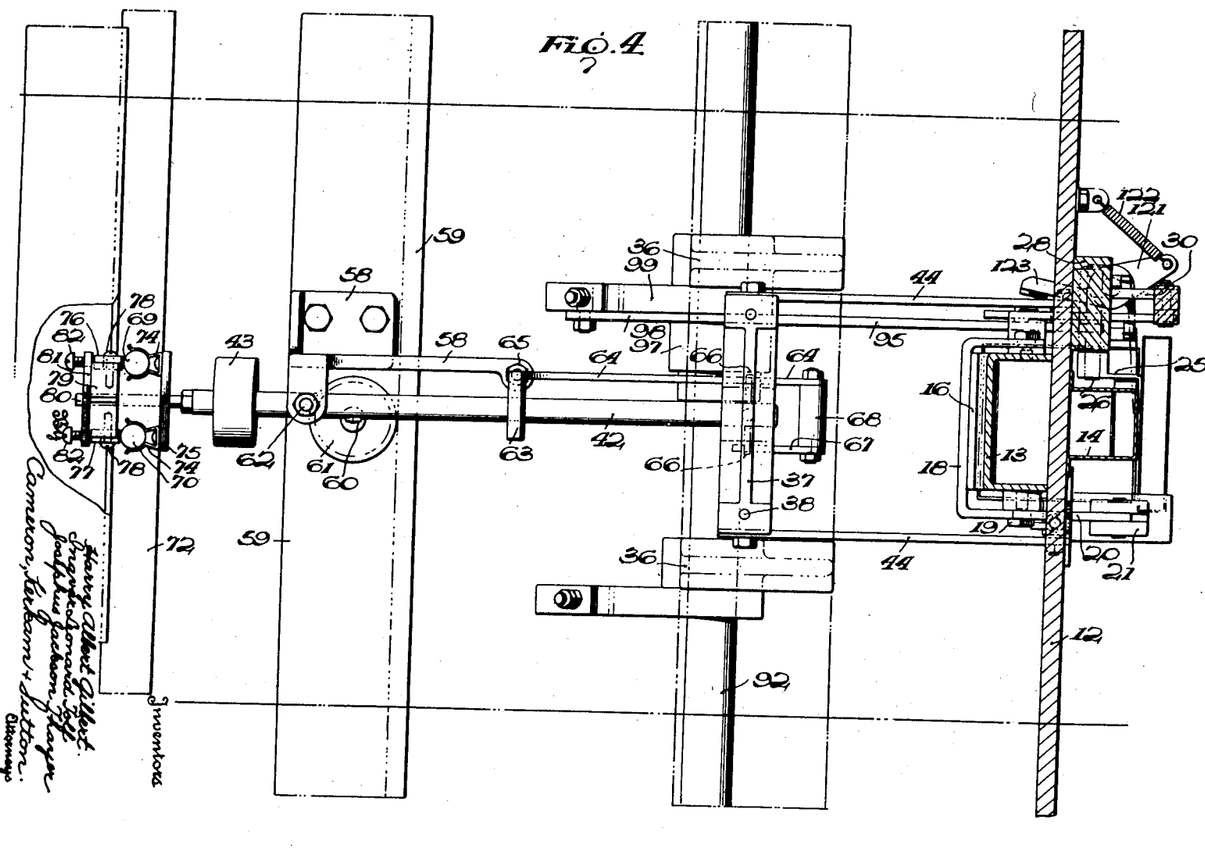
Fig. 4 is a plan view, partly in section, showing one of the weighing units.

With cartons or like receptacles of certain sizes and shapes, it is further necessary to provide means for guiding the material discharged from the buckets into the cartons, and this is preferably accomplished by drop spouts which are moved down to the open tops of the cartons after the latter have been moved into place. In the form shown, drop spouts 124 are mounted on a plate 125, the upper ends of the spouts being flared so as to receive all of the contents of the buckets, and the spouts tapering to a size at their lower ends that is small enough to fit between the open side flaps 126 of the carton. Pointed extensions 127 of the drop spouts are adapted to project down into the carton inwardly of the carton end flaps 128. The carrying plate 125 is mounted to slide up and down by means of end brackets 129 having lugs 130 that slide on rods 131, the latter being mounted in brackets 132 on the frame. The drop spouts are moved up and down as a unit and at the proper time by any suitable means, such as one or more arms 133 (Fig. 2) pivotally mounted on a shaft at 134 at one end and connected to the slide bracket 129, 130 by a link 135, the arm or arms being operated by a connecting rod 136 and rock arm 137 on the shaft 134. Thereupon the buckets are dumped through the drop spouts into the waiting cartons, and the plate 125 rises to free the filled cartons for removal and to permit without interference their replacement by a series of empty cartons.

It will be observed that apparatus embodying the invention requires only a single vibrating feeder to provide both bulk and dribble streams, and that the dribble stream can be regulated nevertheless to provide a fine adjustment of the contents of the bucket. In the case of material comprising fairly large pieces, the dribble feed can be made piece by piece and interrupted practically instantaneously when the charge in the bucket reaches just the right weight. The bulk stream of course continues during this dribble feed to the bucket, but is intercepted and stored in the bulk hopper for delivery all at once to the bucket at the beginning of the next cycle. Thus the time required for filling the bucket and weighing the charge is reduced. These operations are controlled electrically by simple yet effective and reliable means, the number of mechanical movements and parts being kept to a minimum.

It will be understood that the invention is not restricted to the example set forth with particularity in the foregoing description, but is capable of a variety of mechanical embodiments without departing from the spirit of the invention. Also various changes can be made in the form, details of construction and arrangement of the parts, many of which changes will now occur to those skilled in the art. Hence reference should be had to the appended claims for a definition of the limits of the invention.

What is claimed is:

1. Apparatus of the class described comprising a weighing scale having a bucket, separate bulk and dribble hoppers positioned to discharge into said bucket, hopper gates and scale-controlled means for operating said gates, and a vibratory feeder having a main feed passage discharging into said bulk hopper and an auxiliary feed passage of smaller cross section extending beyond the end of said main passage and discharging into said dribble hopper.

2. Apparatus of the class described comprising a weighing scale having a bucket, separate bulk and dribble hoppers positioned to discharge into said bucket, hopper gates and scale-controlled means for operating said gates, and a vibratory feed trough discharging into said bulk hopper and having an integral extension of smaller cross section discharging into said dribble hopper.

3. Apparatus of the class described comprising a weighing scale having a bucket, separate bulk and dribble hoppers positioned to discharge into said bucket, hopper gates and scale-controlled means for operating said gates, and a vibratory feed trough discharging into said bulk hopper and having an extension of smaller size located in the bulk stream to intercept and discharge a part of said stream into the dribble hopper.

4. Apparatus of the class described comprising a weighing scale having a bucket, separate bulk and dribble hoppers positioned to discharge into said bucket, hopper gates and scale-controlled means for operating said gates, and a vibratory feed trough discharging into said bulk hopper, said trough having an integral extension of less width projecting from its discharge edge through the bulk stream and to a point above said dribble hopper.

5. Apparatus of the class described comprising a weighing scale having a bucket, separate bulk and dribble hoppers positioned to discharge into said bucket, gates for said hoppers, a feeder discharging a bulk stream into said bulk hopper and a dribble stream into said dribble hopper, and scale-controlled means for opening both gates and starting said feeder at the beginning of a weighing cycle, for closing the bulk gate at an intermediate point in the cycle, and for closing the dribble gate and stopping the feeder at the end of a cycle.

6. Apparatus of the class described comprising a weighing scale having a bucket, separate bulk and dribble hoppers positioned to discharge into said bucket, gates for said hoppers, a feeder discharging a bulk stream into said bulk hopper and a dribble stream into said dribble hopper, a bulk scale weight, a dribble scale weight positioned to be engaged by the scale at an intermediate point of a weighing cycle, and scale-controlled means for opening both gates and starting said feeder at the beginning of the cycle, for closing the bulk gate substantially at said intermediate point in the cycle, and for closing the dribble gate and stopping the feeder at the end of a cycle.

7. Apparatus of the class described comprising a weighing scale having a bucket, separate bulk and dribble hoppers positioned to discharge into said bucket, normally closed gates for said hoppers, electromagnetic means for opening said gates, an electromagnetically operated feeder discharging a bulk stream into said bulk hopper and a dribble stream into said dribble hopper, and scale-controlled circuits for energizing said feeder and gate-opening means at the beginning of a weighing cycle, for deenergizing the bulk gate-opening means at an intermediate point in the cycle, and for deenergizing said feeder and said dribble gate-opening means at the end of a cycle.

8. Apparatus of the class described comprising a weighing scale having a bucket, separate bulk and dribble hoppers positioned to discharge into said bucket, normally closed gates for said hoppers, electromagnetic means for opening said gates, an electromagnetically operated feeder discharging a bulk stream into said bulk hopper and a dribble stream into said dribble hopper, a bulk scale weight, a dribble scale weight positioned to be engaged by the scale at an intermediate point of a weighing cycle, and scale-controlled circuits for energizing said feeder and said gate-opening means at the beginning of the cycle, for deenergizing said bulk gate-opening means substantially at said intermediate point, and for deenergizing said feeder and said dribble gate-opening means at the end of the cycle.

9. Apparatus of the class described comprising a weighing scale having a bucket, separate bulk and dribble hoppers positioned to discharge into said bucket, gates for said hoppers, resilient means for closing said gates, solenoids for opening said gates, an electromagnetically operated feeder discharging a bulk stream into said bulk hopper and a dribble stream into said dribble hopper, an energizing circuit for the bulk gate solenoid, a second energizing circuit common to the feeder and the dribble gate solenoid, and scale-controlled switches for closing both circuits at the beginning of a weighing cycle, for opening the first circuit at an intermediate point in the cycle, and for opening the second circuit at the end of the cycle.

10. Apparatus of the class described comprising a weighing scale having a bucket, separate bulk and dribble hoppers positioned to discharge into said bucket, gates for said hoppers, resilient means for closing said gates, solenoids for opening said gates, an electromagnetically operated feeder discharging a bulk stream into said bulk hopper and a dribble stream into said dribble hopper, an energizing circuit for the bulk gate solenoid, a second energizing circuit common to the feeder and the dribble gate solenoid, a bulk scale weight, a dribble scale weight positioned to be engaged by the scale at an intermediate point of a weighing cycle, and scale-controlled switches for closing both circuits at the beginning of the cycle, for opening the first circuit substantially at said intermediate point, and for opening the second circuit at the end of a cycle.

11. Apparatus of the class described comprising a weighing scale having a bucket, a normally closed dump gate for the bucket, separate bulk and dribble hoppers positioned to discharge into said bucket, gates for said hoppers, a feeder discharging a bulk stream into the bulk hopper and a dribble stream into the dribble hopper, scale-controlled means for opening both gates and starting said feeder at the beginning of a weighing cycle, for closing the bulk hopper gate at an intermediate point in the cycle, and for closing the dribble hopper gate and stopping the feeder at the end of a cycle, and means for opening said dump gate at timed intervals sufficient to include a weighing cycle between successive dumping operations.

12. Apparatus of the class described comprising a weighing scale having a bucket, a normally closed dump gate for the bucket, separate bulk and dribble hoppers positioned to discharge into said bucket, gates for said hoppers, a feeder discharging a bulk stream into the bulk hopper and a dribble stream into the dribble hopper, scale-controlled means for opening both gates and starting said feeder at the beginning of a weighing cycle, for closing the bulk hopper gate at an intermediate point in the cycle, and for closing the dribble hopper gate and stopping the feeder at the end of a cycle, means for opening said dump gate at timed intervals sufficient to include a normal weighing cycle between successive dumping operations, and latch means preventing opening of said dump gate while the dribble hopper gate is open.

13. Apparatus of the class described comprising a weighing scale having a bucket, a normally closed dump gate for the bucket, separate bulk and dribble hoppers positioned to discharge into said bucket, gates for said hoppers, a feeder discharging a bulk stream into the bulk hopper and a dribble stream into the dribble hopper, scale-controlled means for opening both gates and starting said feeder at the beginning of a weighing cycle, for closing the bulk hopper gate at an intermediate point in the cycle, and for closing the dribble hopper gate and stopping the feeder at the end of a cycle, means for opening said dump gate at timed intervals sufficient to include a normal weighing cycle between successive operations, means for holding a carton in position to receive a charge dumped from said bucket, and latch means preventing opening of said dump gate in the absence of a carton in proper position.

14. Apparatus of the class described comprising a weighing scale having a bucket, a normally closed dump gate for the bucket, separate bulk and dribble hoppers positioned to discharge into said bucket, gates for said hoppers, a feeder discharging a bulk stream into the bulk hopper and a dribble stream into the dribble hopper, scale-controlled means for opening both gates and starting said feeder at the beginning of a weighing cycle, for closing the bulk hopper gate at an intermediate point in the cycle, and for closing the dribble hopper gate and stopping the feeder at the end of a cycle, means for holding a carton in position to receive a charge from said bucket, a spout vertically movable into the mouth of the carton and positioned to receive the charge from the bucket, and means for moving said spout and opening said dump gate at timed intervals sufficient to include a weighing cycle between successive dumping operations.

15. Apparatus of the class described comprising a weighing scale having a bucket, a normally closed dump gate for the bucket, separate bulk and dribble hoppers positioned to discharge into said bucket, normally closed gates for said hoppers, electromagnetic means for opening said gates, an electromagnetically operated feeder discharging a bulk stream into said bulk hopper and a dribble stream into said dribble hopper, scale-controlled circuits for energizing said feeder and gate-opening means at the beginning of a weighing cycle, for deenergizing said bulk gate-opening means at an intermediate point of the cycle, and for deenergizing said feeder and dribble gate-opening means at the end of the cycle, and means for opening said dump gate at timed intervals sufficient to include a weighing cycle between successive dumping operations.

16. Apparatus of the class described comprising a weighing scale having a bucket, a normally closed dump gate for the bucket, separate bulk and dribble hoppers positioned to discharge into said bucket, normally closed gates for said hoppers, electromagnetic means for opening said gates, an electromagnetically operated feeder discharging a bulk stream into said bulk-hopper and a dribble stream into said dribble hopper, scale-controlled circuits for energizing said feeder and gate-opening means at the beginning of a weighing cycle, for deenergizing said bulk gate-opening means at an intermediate point of the cycle, and for deenergizing said feeder and dribble gate-opening means at the end of the cycle, means for opening said dump gate at timed intervals sufficient to include a normal weighing cycle between successive dumping operations, and latch means operated by said dribble gate-opening means for preventing opening of said dump gate while the dribble gate is open.

17. Apparatus of the class described comprising a vertical mounting plate, a pair of hoppers one one each side of said plate opposite each other, gates for said hoppers, a feeder above the plate discharging a bulk stream into one hopper and having an extension discharging a dribble stream into the other hopper, a weighing scale having a bucket below the plate positioned to receive material from both hoppers, and scale-controlled means for opening both gates and starting the feeder at the beginning of a weighing cycle and for closing the bulk gate and thereafter closing the dribble gate and stopping the feeder as the cycle is completed.

18. Apparatus of the class described comprising a vertical mounting plate, a pair of hoppers one on each side of said plate opposite each other, normally closed gates for said hoppers, solenoids mounted on said plate for opening said gates, an electromagnetically operated feeder above the plate discharging a bulk stream into one hopper and having an extension discharging a dribble stream into the other hopper, a weighing scale having a bucket below the plate positioned to receive material from both hoppers, and scale-controlled circuits for energizing said feeder and both solenoids at the beginning of a weighing cycle and for deenergizing the bulk gate solenoid and thereafter deenergizing the feeder and dribble gate solenoid as the cycle is completed.

19. Apparatus of the class described comprising a weighing scale having a bucket, a normally closed dump gate for said bucket, separate bulk and dribble hoppers discharging into said bucket, gates for said hoppers, a feeder discharging a bulk stream into the bulk hopper and a dribble stream into the dribble hopper, scale-controlled means for opening the bulk and dribble gates and starting the feeder at the beginning of a weighing cycle and for closing the bulk gate and thereafter closing the dribble gate and stopping the feeder as the cycle is completed, a rock shaft oscillated at timed intervals sufficient to include a normal weighing cycle between successive oscillations, a dump arm mounted on the shaft for opening the dump gate when the shaft is oscillated, said arm having a lost motion connection with the shaft, and latch means holding the arm against dumping movement when the dribble gate is open.

20. Apparatus of the class described comprising a weighing scale having a bucket, a normally closed dump gate for said bucket, separate bulk and dribble hoppers discharging into said bucket, gates for said hoppers, a feeder discharging a bulk stream into the bulk hopper and a dribble stream into the dribble hopper, scale-controlled means for opening the bulk and dribble gates and starting the feeder at the beginning of a weighing cycle and for closing the bulk gate and thereafter closing the dribble gate and stopping the feeder as the cycle is completed, a rock shaft oscillated at timed intervals sufficient to include a normal weighing cycle between successive oscillations, a dump arm loosely mounted on the shaft and adapted to engage and open said dump gate, a dump lever fixed to the shaft, a resilient connection between said arm and lever, and latch means holding said arm against dumping movement when the dribble gate is open.

21. Apparatus of the class described comprising a weighing scale having a bucket, a normally closed dump gate for said bucket, separate bulk and dribble hoppers discharging into said bucket, gates for said hoppers, a feeder discharging a bulk stream into the bulk hopper and a dribble stream into the dribble hopper, scale-controlled means for opening the bulk and dribble gates and starting the feeder at the beginning of a weighing cycle and for closing the bulk gate and thereafter closing the dribble gate and stopping the feeder as the cycle is completed, a rock shaft oscillated at timed intervals sufficient to include a normal weighing cycle between successive oscillations, a dump arm mounted on the shaft for opening the dump gate when the shaft is oscillated, said arm having a lost motion connection with the shaft, means for holding a carton in position to receive a charge dumped from the bucket, and latch means holding the arm against dumping movement in the absence of a carton in proper position.

22. Apparatus of the class described comprising separate bulk and dribble hoppers, gates for said hoppers, a feeder discharging a bulk stream into said bulk hopper and a dribble stream into said dribble hopper, a pivoted weighing scale having a bucket pivotally hung at one end and positioned to receive material from both hoppers, scale-controlled means for opening both gates and starting the feeder at the beginning of a weighing cycle and for closing the bulk gate and thereafter closing the dribble gate and stopping the feeder as the cycle is completed, and a link for steadying the bucket and preventing swinging on its pivots, said link being pivoted at one end to the bucket and at the other end to a fixed point adjacent the scale pivot.

HARRY A. GILBERT.
INGVAR L. TOLF.
JOSEPHUS J. THAYER.

REFERENCES CITED

The following references are of record in the file of this patent:

UNITED STATES PATENTS

| Number | Name | Date |
|---|---|---|
| 1,394,760 | Perkins | Oct. 25, 1921 |
| 2,076,640 | Howard et al. | Apr. 13, 1937 |
| 2,258,182 | Howard | Oct. 7, 1941 |